(Model.)

F. M. WOOLARD.
POULTRY COOP.

No. 275,314.  Patented Apr. 3, 1883.

Witnesses

Inventor
Francis M. Woolard (Model.)
F. M. WOOLARD.
POULTRY COOP.
No. 275,314. Patented Apr. 3, 1883.
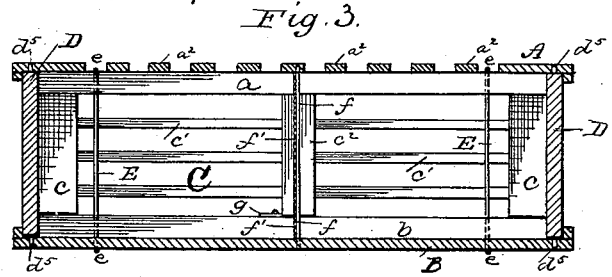
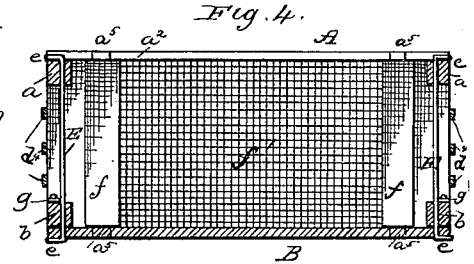
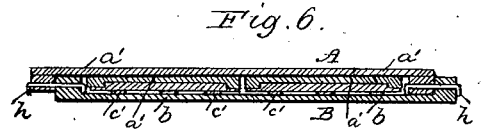
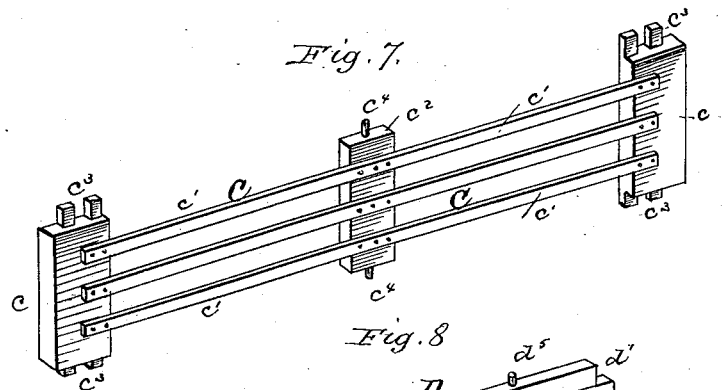
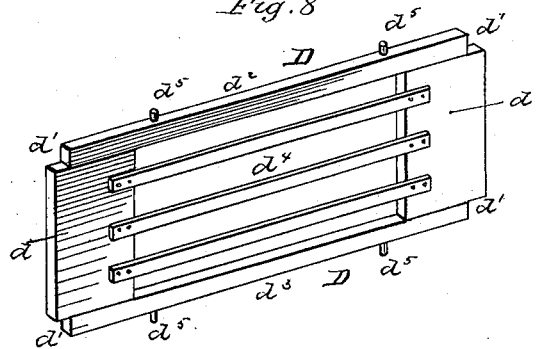
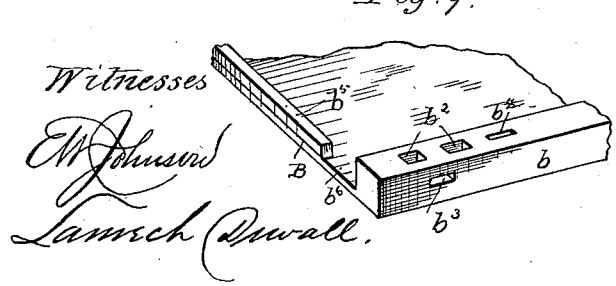
Witnesses
Inventor
Francis M. Woolard

UNITED STATES PATENT OFFICE.

FRANCIS M. WOOLARD, OF FAIRFIELD, ILLINOIS.

POULTRY-COOP.

SPECIFICATION forming part of Letters Patent No. 275,314, dated April 3, 1883.

Application filed February 7, 1883. (Model.)

*To all whom it may concern:*

Be it known that I, FRANCIS M. WOOLARD, a citizen of the United States of America, residing at Fairfield, in the county of Wayne and State of Illinois, have invented certain new and useful Improvements in Poultry-Coops; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of poultry-coops which are used by dealers in transporting poultry to market, its object being to produce a coop which may be stored away in compact form when not in use, which may be readily erected in coop form when desired, and after shipment of poultry therein may be knocked down and quickly packed in small bulk and convenient shape for return-shipment.

The invention consists in certain novel details of construction, which will be hereinafter particularly described, and pointed out in the claims.

Figure 1:
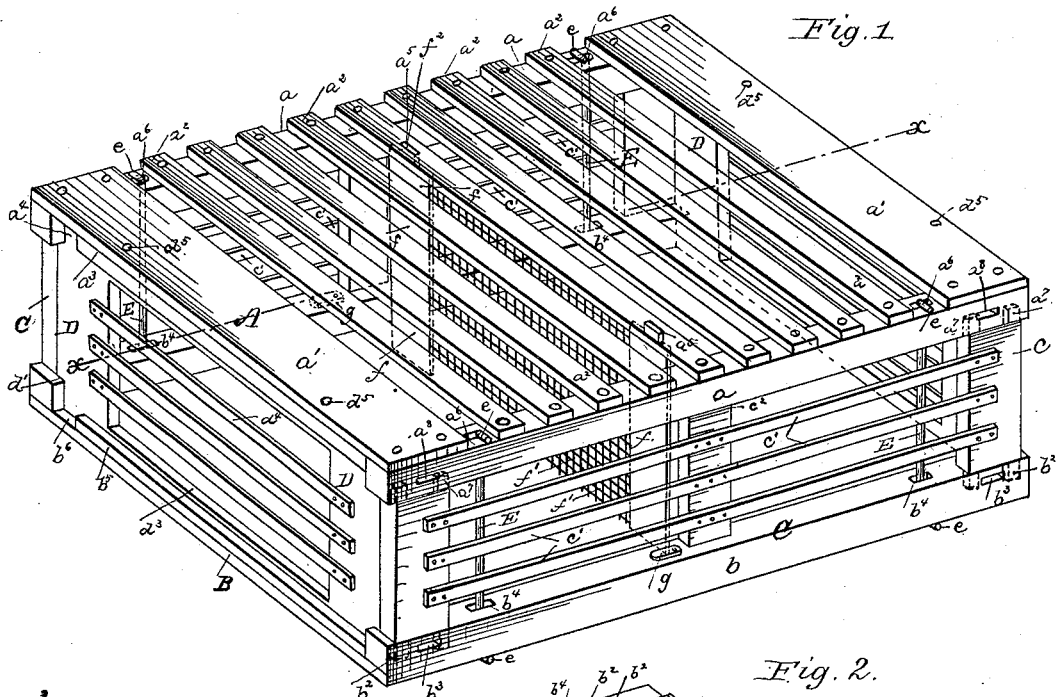
Figure 2:
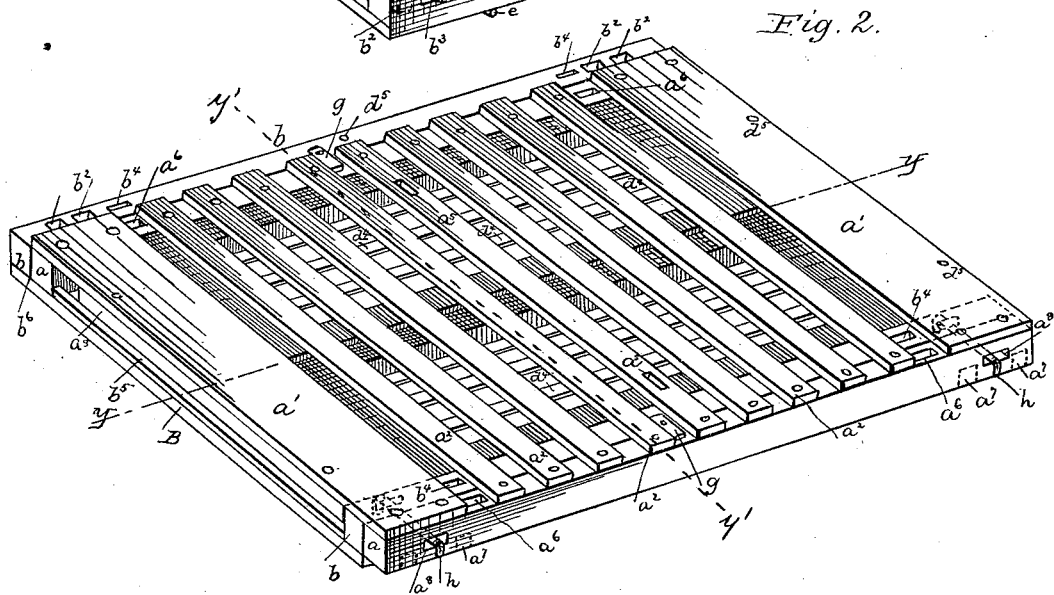

In the accompanying drawings, Figure 1 is a perspective view of my improved poultry-coop ready for use. Fig. 2 is a perspective view of the same knocked down and packed in form for return-shipment after use. Fig. 3 is a section of the coop in the plane indicated on the line $x\,x$, Fig. 1. Fig. 4 is a transverse sectional view. Fig. 5 is a section on the line $y\,y$, Fig. 2. Fig. 6 is a section on the line $y'\,y'$, Fig. 2. Fig. 7 is a perspective view of one of the side frames detached. Fig. 8 is a similar view of one of the end frames. Fig. 9 is a perspective view of a corner of one of the top or bottom frames.

The main parts of the coop are the top and bottom frames, A B, side frames, C C, and end frames D D. These frames are each separate and distinct parts, which may be readily detached from each other, or placed together in coop form, as desired. The top frame consists of two side bars, $a\,a$, connected at their ends by wide slats $a'$ and intermediately by narrow slats $a^2$, one or more of which are secured by latches, so as to be readily removed. From the under side and outer edge of each of the wide slats $a'$ projects a cleat, $a^3$, notched at one end, as shown at $a^4$. The middle narrow slat of the top frame is slotted, as shown at $a^5$, and the side bars, $a\,a$, are slotted near each end, as shown at $a^6$.

The bottom frame, B, is constructed precisely as the top frame, except that it is inclosed on its under side by a solid board instead of slats, this board serving as a bottom for the coop, and being provided with similar slots at points corresponding with the slots $a^5$ in the middle slat of the top frame. Near their ends the side bars $a\,a$ of the top frame are mortised, as shown in dotted lines at $a^7$, Figs. 1 and 2, and the side bars $b$ of the bottom frame are mortised near their ends, as shown at $b^2$ in Figs. 1 and 2, and are also provided near their ends with transverse slots $b^3$, as shown in Figs. 1 and 9. The side bars $a\,a$ of the top frame have also similar transverse slots, indicated by $a^8$.

The side frames, C C, are composed of end posts, $c$, connected by slats $c'$, which may also be braced by intermediate posts, $c^2$. The end posts are provided at their ends with tenons $c^3$, adapted to enter the mortises $a^7$ and $b^2$ in the side bars of the top and bottom frames respectively, and the intermediate posts, $c^2$, if such be used, are provided with pins $c^4$, adapted to enter sockets formed to receive them in the side bars of the top and bottom frames.

The end frames, D D, are composed of end bars, $d$, notched at their ends, as shown at $d'$, top and bottom bars, $d^2\,d^3$, and slats $d^4$. The top and bottom bars, $d^2\,d^3$, are provided with pins $d^5$ to enter sockets in the end slats of the top frame and the bottom board of the bottom frame, respectively.

The main parts of the coop being now described, the manner in which they are put together to form a coop will be understood by reference to Fig. 1. The bottom B is laid upon the ground or floor, with its side bars upward. Side frames, C C, are then set upon the side bars $b$, with their tenons $c^3$ entering the mortises $b^2$ of said side bars. These tenons are located on one side of the side frames, as shown in Fig. 7, so that when they are placed in the mortises $b^2$ they will be flush with outer side of the bars $b$, which bars will project on the inner side, so as to form a step, upon which the notched ends of the end frames, D D, will rest, thus forming a strong and neat joint, whereby the corners of the coop are thoroughly braced. The end frames, D D, are then placed in position, as shown, with their bottom bars against the cleats $b^5$ of the bottom frame, their lower pins, $d^5$, entering sockets in the bottom board, and their notched corners $d'$ fitting over the edges of the side bars $b$, so that the end bars, $d$, of the end frames come snugly against the end bars, $c$. The structure is then ready for the top frame, which is laid upon the side and end frames, so that the upwardly-projecting tenons $c^3$ of the side frames will enter its mortises $a^7$, and the upwardly-projecting pins $d^5$ of the end frames and $c^4$ of the intermediate side posts will enter sockets formed to receive them in the end slats, $a'$, and the side bars $a\ a$, respectively. The main parts of the coop having thus been placed in position they are secured by metallic tie-rods E, which are bent at their ends, as shown at $e$, to extend under and over the side bars of the top and bottom frames respectively. The frame adjacent to the slots may be recessed, so that the bent ends of the tie-rods will be flush therein, and not project beyond the bottom or top of the coop.

It will be understood that the slots $a^6$ and $b^4$ in the side bars of the top and bottom frames are for the purpose of allowing the bent ends of the tie-rods E to pass through the side bars, in order that they may be brought to proper position and so held after being turned, with their end projecting.

The coop being erected as now described incloses a single chamber; but in order to divide it into two compartments, before placing the top frame in position a partition, F, may be arranged transversely therein. This partition consists of two end bars, $f\ f$, connected by open-work screen $f''$, or by slats, as may be desired. The end bars of this partition are provided with tenons $f^2$, which enter the slots $a^5$ in the middle slat of the top frame and corresponding slots in the bottom board of the bottom frame.

The coop having been thus erected, one or more of the slats $a^2$ of the top frame may be removed or swung to one side and the poultry placed in the coop, and these slats being again secured in position the coop of poultry is ready for shipment.

When the coop has reached its destination and the poultry removed the structure may be taken apart by first removing the tie-rods E, and then detaching the several parts from each other in the manner which will be thoroughly understood from the description already given of the manner of placing them together; and in order to place the parts in a compact, convenient package of small bulk for return-shipment, the partition F may be first laid upon the bottom board of the bottom frame transversely between the side bars. The side frames are then laid longitudinally upon the bottom board, side by side, between its side bars, the end bars of the side frames fitting snugly in between the cleats at the opposite ends of the bottom frame. The end frames, D D, are then laid on top of the side frames, their ends coming between the end bars of the side frames. Over all is then placed the top frame, one of its side bars entering the notches $b^6$ in the cleats $b^5$, while one of the side bars $b$ of the bottom frame enters the notches $a^4$ in the cleats projecting from the end slats of the top frame. This brings the top surfaces of the side bars $a$ flush with the top surfaces of the side bars $b$, and in this position they may be held by turning the latch-plates $g$, which are pivoted to the bars $b$, so that they will project over the bars $a$. These latches will ordinarily hold the parts firmly together; but in order to more securely retain them in position I insert through the slots $a^8$ of the bars $a$ and the slots $b^3$ of the bars $b$ metallic tie-bars $h$, having a length equal to the width of both bars $a$ and $b$, and having bent ends $h'$, which may be turned to extend across the edges of said side bars when the tie-bars are placed in position, as shown in Fig. 2. When the coop is thus knocked down and packed it will be seen that it is in very convenient shape for handling, is not liable to be broken, and is in such small bulk that large numbers of the coops may be stored away in very limited space in a railway-car or other vehicle for shipment, and their cost of transportation will be comparatively low.

Having now fully described my invention and explained the manner of using the same, I wish it to be understood that I do not confine myself to the special construction shown in my drawings, but reserve to myself the right to vary the same in any manner for the better carrying out of the essential principles of my improvement without departing from the true spirit and scope thereof.

What I claim is—

1. In a knockdown poultry-coop, the top and bottom frames, having the side bars, $a\ b$, and provided at their ends with cleats having notches $a^4$ and $b^6$, respectively, and the pivoted latches $g$, substantially as described.

2. The combination, with the top and bottom frames, having the side bars, $a$ and $b$, provided with mortises near their ends, as shown, of the side frames, C C, having the end bars, $c$, provided with tenons to enter said mortises, and the end frames, D D, having end bars notched to fit over the said side bars, and provided with pins to enter suitable sockets in the top and bottom frames, substantially as described.

3. The frame D, having notched corners $d'$, in combination with the top A and bottom B, having mortises $b^2$ and sides C, with tenons $c^3$, located on a line with the inner side of the end bars, $c$, substantially as shown, and for the purpose set forth.

In testimony whereof I affix my signature in presence of two witnesses.

FRANCIS M. WOOLARD.

Witnesses:
E. W. JOHNSON,
LAMECH DUVALL.